United States Patent [19]

Huber

[11] Patent Number: 5,430,546
[45] Date of Patent: Jul. 4, 1995

[54] OPTICAL DEVICE FOR MEASURING RELATIVE POSITION OF OR ANGLE BETWEEN TWO OBJECTS

[75] Inventor: Walter Huber, Traunstein, Germany

[73] Assignee: Dr. Johannes Heidenhain GmbH, Traunreut, Germany

[21] Appl. No.: 668,041

[22] Filed: Mar. 12, 1991

[30] Foreign Application Priority Data

Mar. 13, 1990 [DE] Germany ............ 40 07 968.6

[51] Int. Cl.$^6$ ............................................. G01D 9/02
[52] U.S. Cl. .................................. 356/356; 359/569; 250/237 G
[58] Field of Search .................... 356/356, 354; 250/237 G; 359/569, 571, 573

[56] References Cited

U.S. PATENT DOCUMENTS

| | | | |
|---|---|---|---|
| 3,783,753 | 6/1973 | Huntley, Jr. | 250/237 G |
| 4,636,076 | 1/1987 | Pettigrew | 356/356 |
| 4,728,193 | 3/1988 | Bartelt et al. | 356/356 |
| 4,776,701 | 10/1988 | Pettigrew | 356/356 |
| 4,792,678 | 12/1988 | Spies | 250/237 G |
| 4,938,595 | 7/1990 | Parriaux et al. | 356/356 |
| 5,009,506 | 4/1991 | Spies | 356/356 |

FOREIGN PATENT DOCUMENTS 2431551 9/1981 Germany .

OTHER PUBLICATIONS

Lee, *High Efficiency Multiple Beam Gratings*, Applied Optics, vol. 18, No. 13 (1 Jul. 1979), pp. 2152–2158.

X. Lu', Y. Wang, M. Wu and G. Jin, *The Fabrication of a 25×25 Multiple Beam Splitter*, Optics Communications, vol. 72, No. 3, 4, Jul. 15, 1987, pp. 157–162.

*Primary Examiner*—Samuel A. Turner
*Attorney, Agent, or Firm*—Willian Brinks Hofer Gilson & Lione

[57] ABSTRACT

An optical device for measuring length or an angle between two objects has at least one recombination grid which receives partial beams of light, previously diffracted by a diffraction grid. The recombination grid contains two or more grid changes within a single graduation period (d). The ridges of the castellations of the recombination grid may be different in height, so that different phase diffraction angles may be created. The structure of the recombination grid makes it possible to produce diffracted partial beams having discrete phase angles, such as zero, positive one and negative one. Accordingly, each diffracted partial beam interferes with at least one other diffracted partial beam. The recombination grid structure also makes it possible to produce diffracted partial beams of a desired intensity. Accordingly, it is feasible to produce a plurality of diffracted partial beams, having different phase angles, wherein all diffracted partial beams have substantially the same intensity. The diffracted partial beams of discrete phase angles and desired intensity may be produced for a plurality of diffraction orders, such as positive 2 or negative 2.

13 Claims, 3 Drawing Sheets

OPTICAL DEVICE FOR MEASURING RELATIVE POSITION OF OR ANGLE BETWEEN TWO OBJECTS

BACKGROUND OF THE INVENTION

1. Field of the Invention

The invention relates to an optical device, in particular a length- or an angle-measuring device, which detects changes in an interference pattern of at least two light beams which are capable of interference and which are brought to interference by a diffraction grid.

2. Description of Related Art

Length and angle measuring devices (also referred to herein as "arrangements") of this type, are known from many references, for example, from Spies, U.S. Pat. No. 4,792,678 and Pettigrew, U.S. Pat. No. 4,776,701, the entire contents of both of which are incorporated herein by reference.

Such devices operate, generally, by measuring changes in interference pattern of partial beams. In a position measuring arrangement disclosed by Pettigrew, an index grid is a phase grid wherein the phase relation between zero order and first order can be varied by varying the proportion of ridge to groove and the phase depth of castellations of the phase grid.

According to Lee, *High Efficiency Multiple Beam Gratings*, APPLIED OPTICS, Vol. 18, No. 13 (Jul. 1, 1979), pp. 2152–2158, Damman et al. demonstrated that intensities of diffracted orders could be made uniform by controlling the grating profile (Damman et al., OPT. COMMUN. 3,312 (1971). The entire contents of Lee and Damman et al. are incorporated herein by reference.

However, previously known measuring systems based on the dual beam interference of partial beams of varied diffraction order have some disadvantages. For example, such systems use interfering partial light beams which have different degrees of diffraction effect. This leads to an unsatisfactory degree of modulation of the electrical signals generated by the detectors detecting the changes in the interference pattern.

SUMMARY OF THE INVENTION

In contrast to the aforementioned devices of prior art, it is the object of the invention to provide an optical device comprising a recombination grid, which is substantially free of the disadvantages of prior art devices. In the optical device of this invention, the recombination grid is designed in such a manner that it causes interference of diffracted partial beams, so that detectors detecting the interference pattern generate signals of equal size, which have defined phase relations to each other, as well as equal degrees of modulation.

It has now been discovered that the profile (structure) of a recombination grid may be adjusted so that the recombination grid produces diffracted partial beams having distinct, chosen phase angles and desired intensity. The recombination grid of this invention comprises at least two grid changes in a single graduation period defined by a diffraction grid which initially splits a single light beam into partial beams. Each grid change comprises a ridge and a gap between adjacent ridges. The height of the ridges may also be varied.

According to one embodiment of the invention, there is provided an apparatus for measuring length or an angle which utilizes the measurement of interference of at least two partial beams by a recombination grid. The recombination grid causes each partial beam to be diffracted into partial beams of different orders having desired angles. The recombination grid, preferably in the form of a diffraction grid, such as a phase grid, has such physical properties that it imparts a desired intensity to the partial beams diffracted in different orders and desired phase angles to the partial beams diffracted in different orders.

In another embodiment, the invention comprises an apparatus for measuring length or an angle of a first object with respect to a second object. The apparatus utilizes the measurement of changes in a diffraction pattern of at least two partial beams to measure the length or the angle. The apparatus comprises at least one recombination grid having such characteristics that it receives at least two partial beams and it diffracts them into at least four diffracted partial beams. The four diffracted partial beams are grouped into a first pair and a second pair. The first pair comprises a first diffracted partial beam and a second diffracted partial beam (the first diffracted partial beam of the first pair and the second diffracted partial beam of the first pair, respectively). The second pair comprises a first diffracted partial beam and a second diffracted partial beam (the first diffracted partial beam of the second pair and the second diffracted partial beam of the second pair, respectively). The first diffracted partial beam of the first pair has substantially the same phase angle as the second diffracted partial beam of the first pair. The intensity of the first diffracted partial beam of the first pair may be different than the intensity of the second diffracted partial beam of the first pair, but preferably it is substantially the same as the intensity of the second diffracted partial beam of the first pair. The first diffracted partial beam of the second pair has substantially the same phase angle as the second diffracted partial beam of the second pair. The intensity of the first diffracted partial beam of the second pair may be different than the intensity of the second diffracted partial beam of the second pair, but preferably it is substantially the same as the intensity of the second diffracted partial beam of the second pair. The recombination grid has such characteristics that it causes the first diffracted partial beam of the first pair to interfere with the second diffracted partial beam of the first pair to create a first interference pattern. The recombination grid also has such characteristics that it causes the first diffracted partial beam of the second pair to interfere with the second diffracted partial beam of the second pair to create a second interference pattern. The apparatus of this embodiment also comprises a first detector detecting the first interference pattern and a second detector detecting a second interference pattern. The differences, if any, in the first and second interference patterns can be used to indicate a change in relative length (i.e., position) or in angle between two different objects, if one of the objects is attached to a diffraction grid producing the partial beams and the other object is attached to the recombination grid. Such differences can be detected, for example, by maintaining one of two objects stationary while moving the other of the two objects.

In yet another embodiment, the invention comprises a method of measuring position or angle of a first object with respect to a second object, comprising placing the first object on a first support which comprises a diffraction grid and placing the second object on a second support which comprises a recombination grid. The diffraction grid is illuminated with a light beam. The light beam is split by the diffraction grid into at least two partial beams, which are directed to the recombination grid. The two partial beams are diffracted by the recombination grid into at least four diffracted partial beams grouped into a first pair and a second pair. The first pair is comprised of a first diffracted partial beam and of a second diffracted partial beam (the first diffracted partial beam of the first pair and the second diffracted partial beam of the first pair, respectively). The second pair comprises a first diffracted partial beam and a second diffracted partial beam (the first diffracted partial beam of the second pair and the second diffracted partial beam of the second pair, respectively).

The first diffracted partial beam of the first pair has substantially the same phase angle as the second diffracted partial beam of the first pair. The intensity of the first diffracted partial beam of the first pair may be different than the intensity of the second diffracted partial beam of the first pair, but preferably it is substantially the same as the intensity of the second diffracted partial beam of the first pair. The first diffracted partial beam of the second pair has substantially the same phase angle as the second diffracted partial beam of the second pair. The intensity of the first diffracted partial beam of the second pair may be different than the intensity of the second diffracted partial beam of the second pair, but preferably it is substantially the same as the intensity of the second diffracted partial beam of the second pair. The first diffracted partial beam of the first pair is caused by the recombination grid to interfere with the second diffracted partial beam of the first pair to form a first interference pattern. The first diffracted partial beam of the second pair is caused by the recombination grid to interfere with the second diffracted partial beam of the second pair to form a second interference pattern. The first interference pattern is detected by a first detector which produces a first electrical signal. The second interference pattern is detected by a second detector which produces a second electrical signal.

In all embodiments of the invention it is preferred that all diffracted partial beams have substantially the same intensity. In such a preferred embodiment, the electrical signals produced by the first and the second detectors have substantially the same size. The phase relations, i.e., the phase angles, between the signals correspond to the phase relations between the pairs of the diffracted partial beams.

In all embodiments of the invention, it is also possible to have more than two pairs of the diffracted partial beams. In such a case the number of detectors will correspond to the number of pairs of the diffracted partial beams.

The optical device of this invention is also referred to herein as an "apparatus for measuring length or an angle" or as a "position or angle measuring arrangement".

Advantages of the invention reside in an improved degree of effectiveness and improved dependability of the optical device, because the degree of modulation of the interference signals can be considerably increased.

The invention itself, together with objects and attendant advantages, will best be understood by reference to the following detailed description taken in conjunction with accompanying drawings. It should be understood, however, that this description is intended to be illustrative rather than limiting, the scope of the invention being defined by the appended claims and equivalents thereof.

DETAILED DESCRIPTION OF THE PREFERRED EMBODIMENTS

Figure 1:
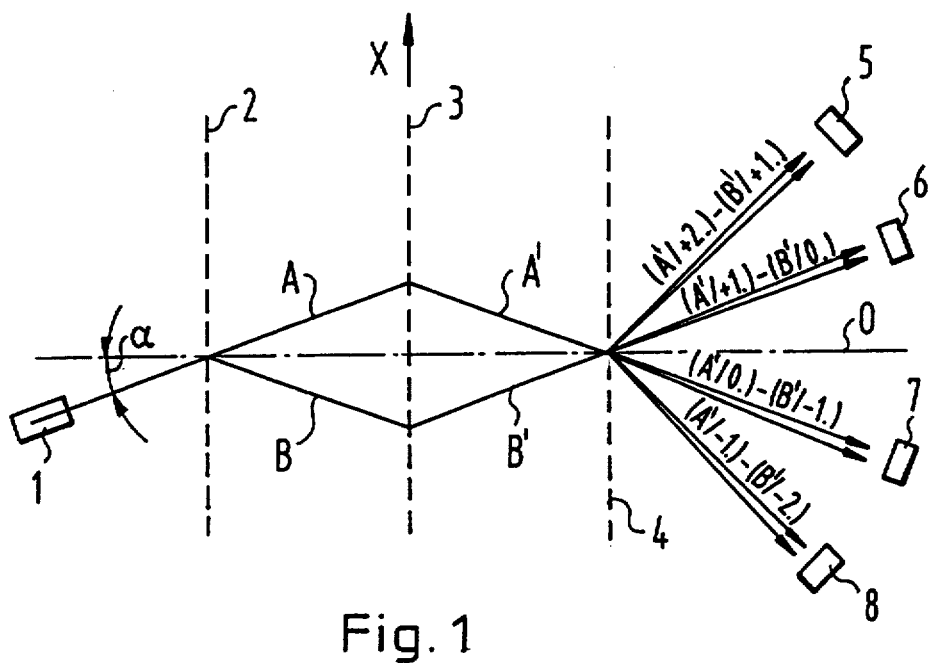
FIG. 1 is a schematic view of one embodiment of the optical device of this invention.

Turning now to the drawings, FIG. 1 shows an optical device operated with transmitted light. The device comprises a first diffraction grid 2 illuminated by a light source 1, which preferably transmits narrow-band light under an angle $a$ with respect to a line 0 which is perpendicular to the plane of the first diffraction grid 2. The diffraction grid 2 is preferably a phase grid. It is also possible to utilize any other suitable optical instrument(s) to split the light beam emitted by the light source 1. The angle $a$ is determined in accordance with the formula $\sin a = L/2d$, where L is the wavelength of the light used and d is a graduation period of the first diffraction grid 2. The graduation period is a distance along the first graduation grid (also referred to herein, in the context of the discussion of the embodiment of FIG. 1, as the "first diffraction grid") comprising one complete ridge and one complete groove. The surface profile of the first graduation grid may have any selected shape, but preferably it has castellated shape, with each castellation having a flat or domed top.

Because of diffraction, two partial beams A and B are created behind the first diffraction grid 2. The two partial beams have the orders of diffraction "0" and "1". These partial beams A and B impinge on a second diffraction grid 3, which is also preferably a phase grid. Any other suitable optical instrument(s) may be used to diffract the partial beams A and B. The second diffraction grid 3 is designed in such a manner that it produces no partial beams of zero diffraction order. This is accomplished by designing the second diffraction grid in a known manner by choosing suitable grid parameters of the second diffraction grid 3.

Of the partial beams generated at the phase grid 3 by diffraction, only the partial beams A' and B' diffracted in the direction towards the line 0, are used. The partial beams A' and B' impinge on a recombination grid 4 where they are diffracted. Therefore, diffracted partial beams $(A'/+2.)-(B'/+1.)$, $(A'/+1.)-(B'/0.)$, $(A'/0.)-(B'/-1.)$, $(A'/-1.)-(B'/-2)$ are produced behind the recombination grid 4. The recombination grid 4 is also any suitable optical instrument, such as a diffraction grid, preferably a phase grid. As shown in FIG. 1, the recombination grid produces diffracted partial beams at specific, distinct phase angles. Accordingly, the diffracted partial beams are grouped into pairs illustrated in FIG. 1, e.g., $(A'/+2.)$ with $(B'/+1.)$, $(A'/+1.)$ with $(B'/0.)$. Both of the diffracted partial beams in each pair have substantially the same phase angle and therefore they interfere with each other. The interference of each of the pairs is detected by the photoelectrical elements 5, 6, 7, 8 and it is converted into electrical signals, which are evaluated in a known manner in incremental position measuring arrangements. Alternatively stated, the interfering partial beams impinge on the photoelectrical elements 5, 6, 7 and 8 where they are converted to electrical signals, evaluated in a known manner.

The interfering partial beams of each pair preferably have substantially the same intensity. For example, it is preferred that the diffracted partial beam (A′/+2.) has substantially the same intensity as the diffracted partial beam (B′/+1.). It is also preferred that all of the interfering partial beams have substantially the same intensity. In such a case, each of the interfering partial beams (A′/+2.), B′/+1.), (A′/+1.), (B′/0.), (A′/0.), (B′/−1.), A′/−1.) and (B′/−2.) has substantially the same intensity. Of course, it is also possible to have two interfering partial beams in the same pair of different intensities and beams of different pairs of different intensities.

If all the interfering partial beams have the same intensity, then the electrical signals produced by the photoelectrical elements (also referred to herein as "detectors") have substantially equal size. The phase relations between the signals correspond to phase relations (phase angles) between diffracted partial beams.

By displacement of the second diffraction grid 3 with respect to the first diffraction grid 2 and the recombination grid 4 in the direction of arrow "X", a phase shift is imparted to the partial beams A′ and B′ diffracted at the phase grid 3. By displacement of the grid 3 by one graduation period, two complete sinusoidal modulations of intensity are created behind the recombination grid 4 in the diffracted partial beams (A′/+2.), B′/+1.), (A′/+1.), (B′/0.), (A′/0.), (B′/−1.), (A′/−1.) and (B′/−1.). The purpose of the recombination grid 4 is to generate the desired intensities of the diffracted partial beams and degrees of modulation in the selected directions as well as the desired phase relations between the selected directions of the diffracted partial beams.

The recombination grid 4 and its variations are illustrated in FIGS. 4B, 4C, 5 and 6 and they will be described at a later time.

Figure 2:
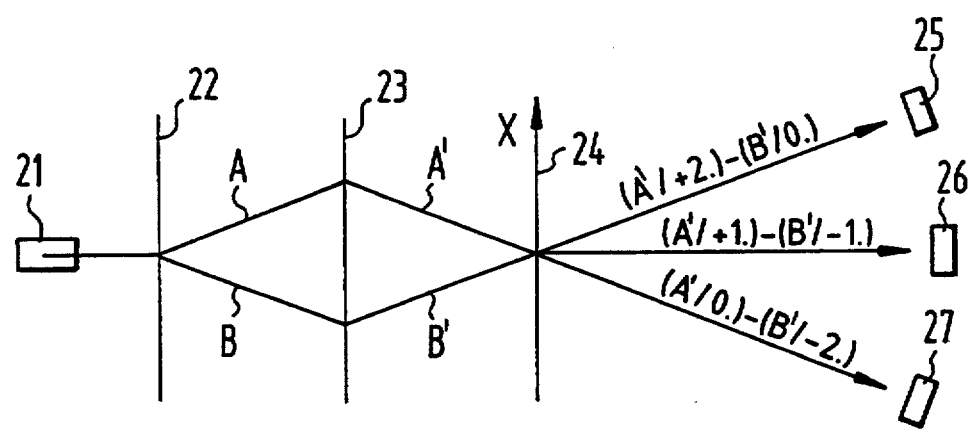
FIG. 2 is a schematic view of an alternative embodiment of the optical device of this invention.

An alternative embodiment of an optical device of this invention is illustrated in FIG. 2, in a more simplified schematic diagram than the embodiment of FIG. 1. In the embodiment of FIG. 2, the recombination grid is movable in the X-direction. This embodiment, discussed in detail below, illustrates that either the diffraction grid or the recombination grid may be moved, i.e., may be used as the standard.

The optical device of FIG. 2 comprises an illuminating device 21, preferably a narrow band light producing device similar to that of the light source in FIG. 1. The light beam emitted by the device 21 is directed onto a diffraction grid 22 wherein it is split into two partial beams A and B, capable of interference. The partial beams A and B are diffracted again at a second diffraction grid 23 into partial beams A′ and B′. The partial beams A′ and B′ impinge onto a recombination grid 24 and are again diffracted by the recombination grid 24. The recombination grid 24 has such properties that it diffracts each of the partial beams A′ and B′ into diffracted partial beams of discrete phase angles with respect to the original phase angle of the partial beams A′ and B′ upstream of the recombination grid 24. For example, the partial beam A′ is diffracted by the recombination grid 24 into diffracted partial beams of zero order, (A′/0.), positive first order, (A′/+1.), and positive second order, (A′/+2.). The partial beam B′ is diffracted by the recombination grid 24 into diffracted partial beams of zero order, (B′/0.), negative first order, (B′/−1.), and negative second order, (B′/−2.).

Therefore, each of the diffracted partial beams has the same phase angle as at least one other diffracted partial beam. Such at least two diffracted partial beams form a pair of diffracted partial beams which interfere with each other. For example, the diffracted partial beam (A/+2.) interferes with the diffracted partial beam (B/0.), as illustrated schematically in FIG. 2. The diffracted and interfering partial beams (A′/+2.)−(B′/0.), (A′/+1.)−(B′/−1.), (A′/0.)−(B′/−2.) impinge on detector devices 25, 26, 27, which convert them into measuring signals which are phase-shifted with respect to each other.

The intensity of each diffracted partial beam may be different. Preferably, the intensity of the two diffracted partial beams in each pair is substantially the same. It is further preferred that all diffracted partial beams have the same intensity.

The first diffraction grid 22 and the second diffraction grid 23 are preferably phase grids. The recombination grid 24 is preferably a diffraction grid, most preferably a phase grid.

In contrast to the exemplary embodiments of FIGS. 1 and 2 using transmitted light, the optical device of the invention can also be used in connection with an incident light, which may require a changed geometric arrangement of the components of the invention but which would not depart from the scope of the invention.

Figure 3:
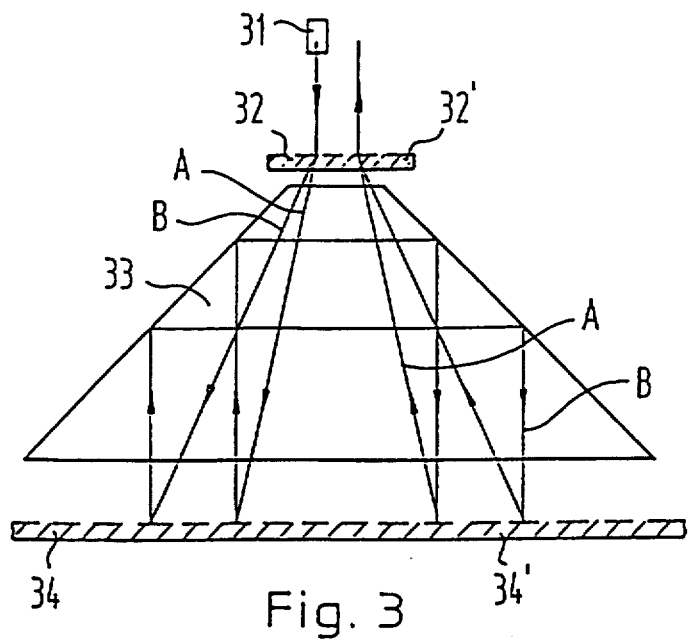
FIG. 3 is a schematic view of an optical device of this invention used with incident light.

An example of such a variation is shown in FIG. 3. In FIG. 3, components corresponding to those of FIG. 1 are designated by the same numerals as in FIG. 1, preceded by a prefix of "3". For example, a light source 31 of FIG. 3 corresponds to a light source 1 of FIG. 1.

Emanating from a light source 31, an illuminating beam is split by a first diffraction grid 32 into partial beams A and B, which extend in different directions.

A special component of this exemplary embodiment is a triple prism 33 located between the first diffraction grid 32 and a second diffraction grid 34. The tip of this triple prism 33 has been removed. Accordingly, the partial beams A and B enter at the surface opposite the base of the prism, which was created by the removal of the tip, instead of entering at the base as is customary.

Without considering the different diffraction indices, which can be disregarded in this as well as in the other exemplary embodiments, the partial beams A and B penetrate unaltered the triple prism from the back and impinge on the second diffraction grid 34, which in this embodiment is designed as a reflection grid. The partial beams A and B are aligned parallel to each other by diffraction of the reflection grid 34 and then enter the triple prism 33 from the base. The partial beams penetrate the triple prism 33 and are reflected off the walls of the prism, as shown in FIG. 3. While the partial beams A, B are within the prism 33 they are maintained in parallel relation to each other. The partial beams A, B exit the prism 33 and impinge on a third diffraction grid 34′, which in this embodiment is also a reflection grid. The partial beams A and B are parallel to each other when they impinge onto the third diffraction grid 34′. The partial beams are again diffracted at the third diffraction grid 34′ and are reflected by the surface of the third diffraction grid 34′ through the prism 33 onto a recombination grid 32'. The recombination grid 32' diffracts the partial beams into diffracted partial beams A', B' (not shown separately). The diffracted partial beams come to interference at the recombination grid 32' and the light-dark modulation can be detected.

In the embodiment of FIG. 3, as in all embodiments of the invention, changes in the distance between the recombination grid 32' and the third diffraction grid 34' lead to proportional variations in the path differences of the interfering partial beams A and B, the light-dark modulation of which provides the distance measurement signal.

In the embodiment of FIG. 3, the diffraction grids 32, 34 and 34' are preferably phase grids. The recombination grid 32' is preferably a diffraction grid, most preferably a phase grid. A single diffraction grid may be used to perform the function of the first diffraction grid 32 and the recombination grid 32', as illustrated in FIG. 3. A single diffraction grid may also be used to perform the function of the second diffraction grid 34 and the third diffraction grid 34' as also illustrated in FIG. 3.

As in the embodiments of FIGS. 1 and 2, the diffracted partial beams A' and B' have discrete phase angles. Therefore, each diffracted partial beam has the same phase angle as at least one other diffracted partial beam. Such at least two diffracted partial beams form a pair of diffracted partial beams which interfere with each other.

As in the embodiments of FIGS. 1 and 2, the intensity of the diffracted partial beams may be different. It is preferred that the intensity of the diffracted partial beams in each pair be substantially the same. It is further preferred that all diffracted partial beams have the same intensity.

Figure 4:
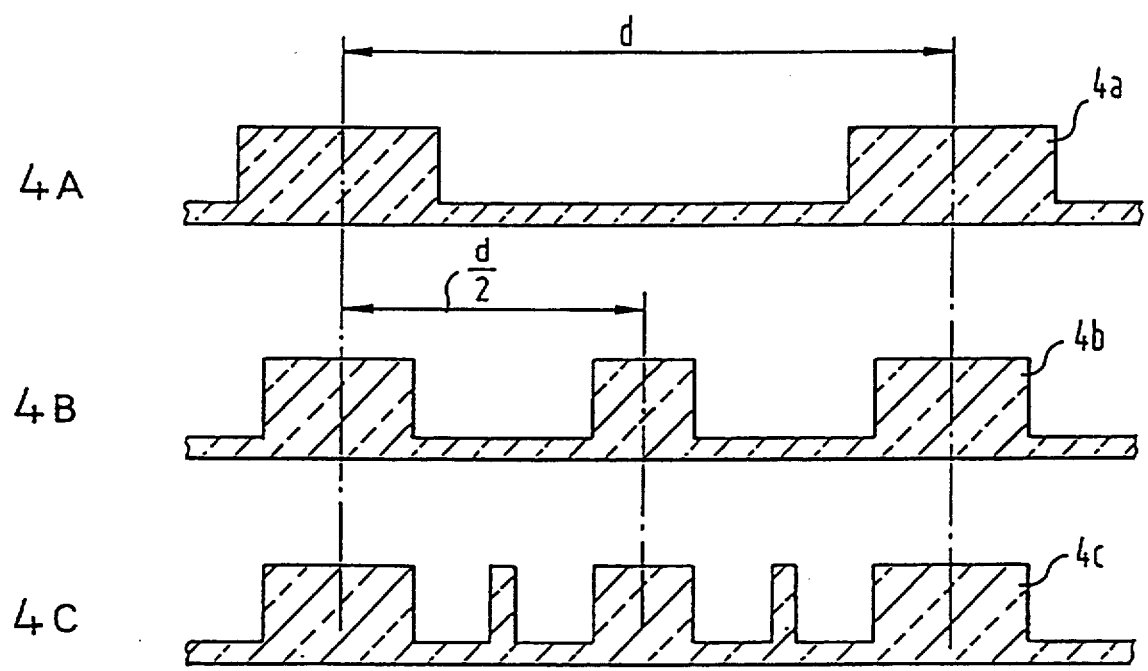
FIG. 4 shows various recombination grid cross sections.

Various cross sections of phase grids are illustrated in FIG. 4. Some of such phase grids may be used as recombination grids, such as recombination grids 4, 24, and 32' in the embodiments discussed above. However, this invention also encompasses the use of diffraction grids having the physical and optical properties of the recombination grid. For example, diffraction grids 2, 3, 22, 23, 32, 34 and 34' may have the same properties as the recombination grids 4, 24 and 32'. In one preferred embodiment, only the recombination grid has such physical and optical properties.

With the graduation period d defined, the ridges of the phase grid 4a of the first example of FIG. 4 are narrower than the grooves. Thus the ridge/groove ratio markedly differs from 1:1. The grid 4a of FIG. 4A comprises only one grid change within a single graduation period d. The grid 4a is representative of prior art grids, e.g., those disclosed by Pettigrew, U.S. Pat. No. 4,776,701.

In the second example (FIG. 4B), a phase grid 4b is constructed differently than the grid 4a, while the same graduation period d is maintained. The grid 4b has twice as many grid changes as the first phase grid 4a in a single graduation period d. This is achieved by the addition of an additional ridge (castellation) within the graduation period d. However, the profile of the grid remains symmetrical.

A third example (FIG. 4C) illustrates a yet another structured phase grid 4c, in which the number of the grid changes within the graduation period d is again doubled, as compared to the grid 4b. Although the profile of the grid remains symmetrical in FIG. 4C, the positions of the grid changes may be arbitrarily distributed.

Figure 5:
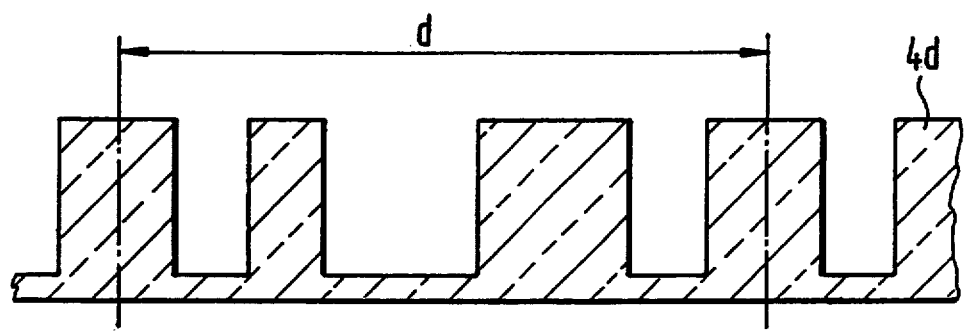
FIG. 5 shows a recombination grid of this invention with asymmetrically arranged grid changes.

This is illustrated in FIG. 5, wherein the phase grid 4d has asymmetrically distributed two grid changes within a single graduation period d.

Figure 6:
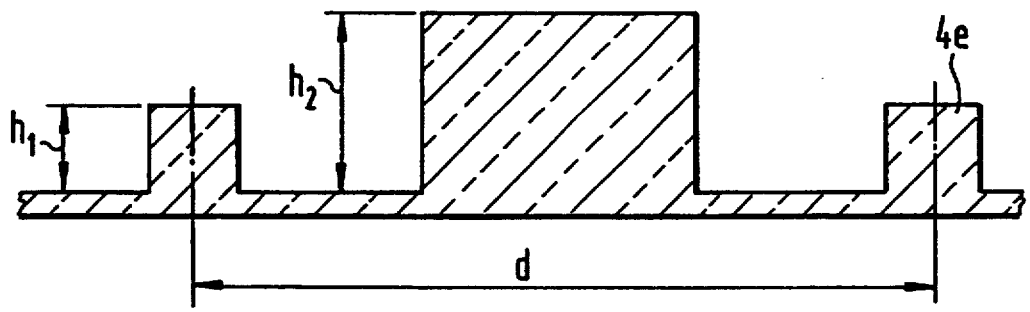
FIG. 6 shows a cross section of yet another recombination grid of this invention.

Yet another design of the diffraction grid is illustrated in FIG. 6. In a phase grid 4e of FIG. 6, the height h1, h2 of the ridges, i.e., the phase depth, varies in addition to the variations of grid profiles described above in connection with the discussion of FIGS. 4A–4C and 5. The difference in height of the ridges makes it possible to set desired phase relations between higher orders of diffraction of partial beams.

Any of the grids of FIGS. 4B, 4C, 5 and 6 may be used as the recombination grids of this invention because the grids of FIGS. 4B, 4C, 5 and 6 comprise two or more grid changes within a single graduation period.

The structure of phase grids of this invention which may be used as the recombination grids is designed in accordance with mathematical laws. The recombination grids make it possible to set a plurality of intensity proportions of partial beams diffracted in different orders and the phase angles between the various diffraction orders.

Lu et al., *The Fabrication of a 25×25 Multiple Beam Splitter*, OPTICS COMMUNICATIONS, Vol. 72, No. 3, 4, Jul. 15, 1987, pp. 157–162, the entire contents of which are incorporated herein by reference, discloses mathematical principles which can be used to construct diffraction grids. The principles discussed by Lu et al. may be used to design diffraction grids, but Lu et al. do not disclose the structure or properties of the recombination grids of this invention because they fail to disclose or suggest grids which produce diffracted partial beams having distinct, chosen phase angles.

It is to be understood that a wide range of changes and modifications can be made to the embodiments described above. It is therefore intended that the foregoing detailed description be regarded as illustrative rather than limiting, and that it be understood that it is the following claims including all equivalents which are intended to define the spirit and scope of this invention.

What is claimed is:

1. In an optical device for measuring length or an angle, utilizing the generation of dual beam interferences by means of a recombination grid, in which at least two partial beams which are capable of interference are united at a recombination grid and are brought to interference, an improvement comprising:
providing at least one recombination grid, in the form of a phase grid, the recombination grid comprising at least two grid changes within a single graduation period and having such physical properties that it imparts a desired intensity to partial beams diffracted in different orders and imparts desired phase angles to the partial beams diffracted in different orders.

2. The optical device in accordance with claim 1, wherein the grid changes are at different distances from each other.

3. The optical device in accordance with claim 1, wherein the phase depth between each of two adjacent grid changes is different.

4. The optical device in accordance with claim 1, wherein the grid changes are symmetrically disposed within the single graduation period.

5. The optical device in accordance with claim 1, wherein the grid changes are asymmetrically disposed within the single graduation period.

6. An apparatus for measuring length or an angle of a first object with respect to a second object utilizing the measurement of changes in a diffraction pattern of partial beams of light comprising:

at least one recombination grid having such characteristics that it receives at least two partial beams and diffracts them into at least four diffracted partial beams grouped into a first pair, comprised of a first diffracted partial beam of the first pair and a second diffracted partial beam of the first pair, and a second pair, comprised of at least a first diffracted partial beam of the second pair and a second diffracted partial beam of the second pair, the first diffracted partial beam of the first pair having substantially the same intensity and phase angle as the second diffracted partial beam of the first pair and the first diffracted partial beam of the second pair having substantially the-same intensity and phase angle as the second diffracted partial beam of the second pair, wherein the recombination grid comprises at least two grid changes within a single graduation period.

7. An apparatus for measuring length or an angle of a first object with respect to a second object utilizing the measurement of changes in a diffraction pattern of partial beams of light comprising:

at least one recombination grid having such characteristics that it receives at least two partial beams and diffracts them into at least four diffracted partial beams grouped into a first pair, comprised of a first diffracted partial beam of the first pair and a second diffracted partial beam of the first pair, and a second pair, comprised of at least a first diffracted partial beam of the second pair and a second diffracted partial beam of the second pair, the first diffracted partial beam of the first pair having substantially the same intensity and phase angle as the second diffracted partial beam second pair having substantially the same intensity and phase of the first pair and the first diffracted partial beam of the angle as the second diffracted partial beam of the second pair, and wherein the recombination grid comprises more than two grid changes within a single graduation period.

8. The apparatus of claim 7, wherein the phase depth between each of two adjacent grid changes is different.

9. A recombination grid comprising at least two grid changes in a single graduation period, the grid changes being at different distances from each other.

10. The recombination grid of claim 9, wherein the phase depth between each of two adjacent grid changes is different.

11. The recombination grid of claim 9, wherein the grid changes are symmetrically disposed within the single graduation period.

12. The recombination grid of claim 9, wherein the grid changes are asymmetrically disposed within the single graduation period.

13. The optical device of claim 1, wherein the recombination grid produces at least four of the partial beams diffracted in different orders, the at least four partial beams being grouped into a first pair, comprised of a first diffracted partial beam of the first pair and a second diffracted partial beam of the first pair, and a second pair, comprised of at least a first diffracted partial beam of the second pair and a second diffracted partial beam of the second pair, the first diffracted partial beam of the first pair having substantially the same intensity and phase angle as the second diffracted partial beam of the first pair and the first diffracted partial beam of the second pair having substantially the same intensity and phase angle as the second diffracted partial beam of the second pair.

* * * * *